Nov. 19, 1963    K. W. JONES    3,111,064
MACHINE FOR FORMING AND ASSEMBLING PAPERBOARD CARRIERS
Filed Jan. 8, 1962    5 Sheets-Sheet 1

INVENTOR.
KENNETH W. JONES,
BY
Jungblut, Melville, Strauss & Foster
ATTORNEYS.

Nov. 19, 1963  K. W. JONES  3,111,064
MACHINE FOR FORMING AND ASSEMBLING PAPERBOARD CARRIERS
Filed Jan. 8, 1962  5 Sheets-Sheet 2

INVENTOR.
KENNETH W. JONES,
BY
ATTORNEYS.

INVENTOR.
KENNETH W. JONES,

ATTORNEYS.

Nov. 19, 1963  K. W. JONES  3,111,064
MACHINE FOR FORMING AND ASSEMBLING PAPERBOARD CARRIERS
Filed Jan. 8, 1962  5 Sheets-Sheet 4

INVENTOR.
KENNETH W. JONES,

ATTORNEYS.

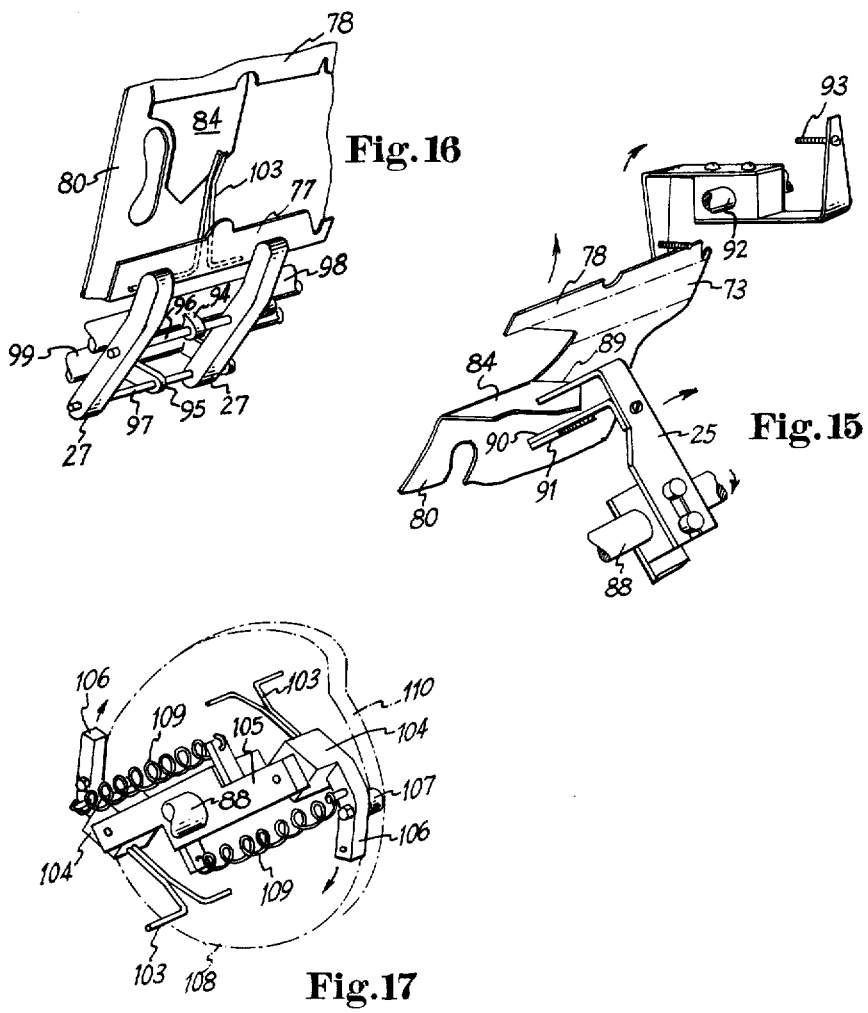

United States Patent Office 3,111,064
Patented Nov. 19, 1963

3,111,064
MACHINE FOR FORMING AND ASSEMBLING
PAPERBOARD CARRIERS
Kenneth W. Jones, Franklin, Ohio, assignor, by mesne
assignments, to The Lord Baltimore Press Incorporated,
New York, N.Y., a corporation of Maryland
Filed Jan. 8, 1962, Ser. No. 165,471
27 Claims. (Cl. 93—45)

This invention has to do with the manufacture of paperboard cartons and more specifically with an integrated machine for converting a continuous web of pre-printed boxboard or paperboard into finished carton structures, such as bottle carriers of the type designed to be formed from a single bank which is adapted to be folded to a flat or collapsed form and which can be opened into a set-up position quickly and easily to provide a structure having a handle and divided transversely into a plurality of separate bottle receiving pockets or cells.

Heretofore, such carrier structures have been manufactured in a number of separately performed operations each of which entails costly labor in the handling of the materials and their transportation from place to place for the performance of the various manufacturing operations. For example, in the manufacture of a typical paperboard bottle carrier such as might be used for the packaging of a sales unit of soft drinks and the like, the paperboard—whether in web or sheet form—is first printed, whereupon the printed sheets or webs are conveyed to a cutting and scoring press where the carrier blanks are die cut and stripped, and the stripped blanks stacked on pallets or the like for delivery to the folding and gluing machine where the carrier structures are assembled. Upon delivery to the folding and gluing machine, the blanks must be stacked in a hopper or otherwise fed into the machine which acts to fold and glue the blanks to form the knocked-down carrier structures which are then collected and packed for shipment to the user in the knocked-down form.

As opposed to the foregoing, a principal object of the instant invention is the provision of an integrated carrier forming and assembling machine wherein a continuous web of pre-printed paperboard is converted into finished carrier structures in a continuous operation, the machine acting to automatically cut and score the paperboard web into individual carrier blanks which are then stripped and advanced to succeeding sections of the machine wherein the blanks are folded and glued, the completed flat folded carrier structures being delivered from the exit end of the machine in condition for shipment to the user.

Still a further object of the instant invention is the provision of a machine of the character described which is capable of the high speed continuous fabrication of paperboard bottle carriers and similar carton structures, such machine incorporating a number of novel mechanisms which coact to convert a web of paperboard into assembled and knocked-down carrier structures.

Still a further object of the instant invention is the provision of unique mechanism for effecting the die cutting and scoring of the paperboard web to form individual carrier blanks, together with mechanism acting to thereafter strip and remove waste areas from the blanks and deliver them to a novel form of rotary folding and gluing device wherein the articulated parts of the carrier blanks are acted upon by coacting sets of folding fingers arranged to infold and secure designated parts of the blanks while they are moving in a circular path.

The foregoing, together with other objects of the instant invention which will appear hereinafter or which will be apparent to the skilled worker upon reading these specifications, I accomplish by that construction and arrangement of parts of which I shall now describe an exemplary embodiment.

Reference is now made to the accompanying drawings wherein:

FIGURE 15 is a fragmentary perspective view illustrating the operation of the rotary folding fingers.

FIGURE 16 is a fragmentary perspective view illustrating the operation of the reciprocating folding fingers mounted on the folding cylinder.

FIGURE 17 is a fragmentary perspective view illustrating the folding bars which coact with the reciprocating folding fingers.

*General Organization*

Figure 1:
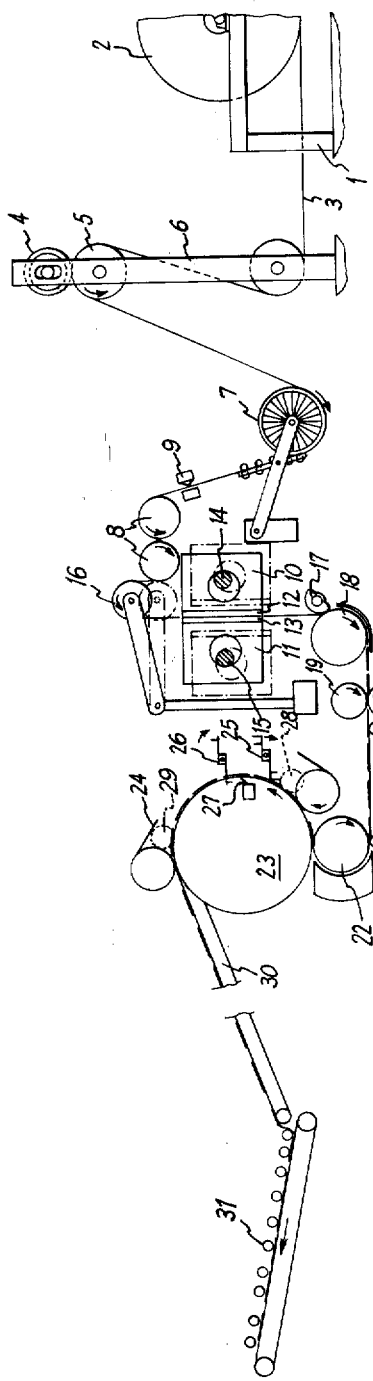
FIGURE 1 is a schematic elevational view illustrating the over-all operation of a carrier forming and assembling machine in accordance with the invention.

Referring first to FIGURE 1 of the drawings which schematically illustrates the operation of the machine, a roll stand 1 mounts a roll 2 of pre-printed paperboard from which the web 3 is withdrawn by means of the driven feed roller 4 which coacts with an idler roll 5 mounted on support 6. Preferably, the feed roll 4 will be driven in timed relation to the machine drive and its speed will be constant for any given machine operating speed.

A movable tension wheel 7 is pivotally mounted to the machine frame and arranged to ride on the web 3 to maintain it in taut condition as it passes around metering rolls 8 which act, in well known manner, through suitable electronic sensing means 9, to synchronize the printed indicia on the web with the cutting and scoring dies which are indicated generally at 10 and 11. These dies include an opposing pair of vertically disposed coacting platen members 12 and 13 which mount suitable cutting knives and scoring rules effective, as the platen members are brought together, to die cut and score the paperboard web to define carton blanks. The dies are mounted for movement in a generally circular path by means of eccentric shafts 14 and 15, although as will be pointed out in the detailed description which follows, the dies are mounted in such a way that they will effect a rocking action of the platen members as they engage the web.

Just before the web moves downwardly between the platen members, it first passes around an oscillating wheel 16 which is moved toward and away from the platen members in timed relation to the opening and closing of the dies, the arrangement being such as to co-ordinate the advancement of the web with the movement of the platen members. That is, the oscillating wheel 16 moves upwardly toward its uppermost position when the platen members are closed, thereby effectively taking up the slack in the advancing web during the time the web is engaged between the dies. When the dies open to release the web, the oscillating wheel moves toward its lowermost position (shown in dotted lines), thereby effectively accelerating the feeding speed of the web so that a greater length of the web will be moved between the platen members than would be possible if the web were fed at its initial constant rate of speed.

As the dies open and the web is moved downwardly, a completely cut and scored carrier blank will emerge, although the blank still will be connected to the remainder of the web along a transversely disposed line for severance; and in addition the blank will be of generally rectangular outline in that the scrap or waste areas will not yet have been removed. The dimensioning of the parts is such that as the die begins to open, the leading edge of the web and the leading blank defined therein—which was formed during the immediately preceding cycle of the dies—will be engaged by a rotary kicker 17 which acts to press the leading edge of the web against an indexing roll 18. The kicker 17 will be driven at a speed such that it will accelerate the movement of the leading edge of the web sufficiently to separate the lowermost blank defined therein from the remainder of the wab along its line for severance. The indexing roll 18, which carries retractable blank engaging lugs, acts to bring the now separated blank into proper timed relation to sets of coacting stripping wheels 19 and 20 which act to "scrap" the blank, the waste material removed from the blank being removed by means of vacuum trap 21.

Following removal of the waste material, the stripped blank is next passed about a second indexing roll 22 which is similar to the indexing roll 18 and acts to retime the blank for contact with the rotary folder 23 against which the blank is maintained by a traveling belt 24. The folding of the blank while secured to the rotary folder is accomplished by means of sets of rotating folding fingers 25 and 26 which act to infold, i.e. fold rearwardly, selected leading parts of the blank, while at the same time selected trailing parts of the blank are folded forwardly, i.e. in the direction of movement of the blank, by means of retractable fingers 27 mounted on the rotary folder 23 and cam actuated to project therefrom. It will be understood that prior to the action of the sets of folding fingers, the blank will be first contacted by a set of glue rolls 28 which apply adhesive to the various parts of the blank which are to be infolded and secured by means of the folding fingers.

Before the partially folded blank leaves the rotary drum, it may be contacted by a second adhesive applicator 29 which acts to apply adhesive to additional parts of the partially folded and glued blank, whereupon the blank enters a straight line belt folder 30 which acts to infold and adhere additional parts of the blank to bring it to its final knocked-down condition. The blank will now be completely folded and glued and, as a final step, is may be subjected to the action of a series of pressure rolls 31 which serve to seal the parts together under positive pressure, whereupon the knocked-down carton structures are discharged from the machine.

With the foregoing general description of the machine now in mind, its various operating components will now be considered in greater detail.

Feeding and Metering Means

The withdrawal of the web 3 from the supply roll 2 may be accomplished in numerous ways, although as already pointed out it is preferred to employ a driven feed roll 4 to withdraw the web at a constant rate of speed and to utilize the tension wheel 7 to compensate for any variation in feeding speed occasioned by the metering rolls 8. The metering rolls 8 do not constitute a limitation on the invention and may comprise any one of a number of variable speed driven rolls which are linked to a sensing device, such as a photo-electric cell, which is responsive to a repetitive marking on the web to either speed up or slow down the metering rolls in the event the printed indicia on the web goes out of registry with respect to the cutting and scoring dies. The tension wheel 7 provides a loop in the web which will be taken up at such times as the metering rolls advance the web more rapidly than it is payed out by the feed roll 4, and conversely, the loop is increased at such times as the metering rolls operate at a slower rate of speed than the feed roll.

The Cutting and Scoring Dies

Referring now to FIGURES 4 through 8 of the drawings, the platen members 12 and 13 are each mounted in die housings 32 and 33, respectively, which housings terminate downwardly in depending legs 34, 35 pivotally connected at 36, 37, to links 38, 39 which in turn are pivotally connected at 40, 41 to the fixed supports 42 and 43. The movement of the die housings 32, 33 and hence the movement of the platen members 12 and 13 is effected by means of the eccentric driven shafts 44 and 45 which are rotatably journaled in the die housings. Essentially, the eccentric shafts impart a rotary movement to each of the die housings, but by reason of their pivotal connection to the links 38, 39, a rocking motion is also imparted to the platen members as they move to the closed position.

Figure 5:
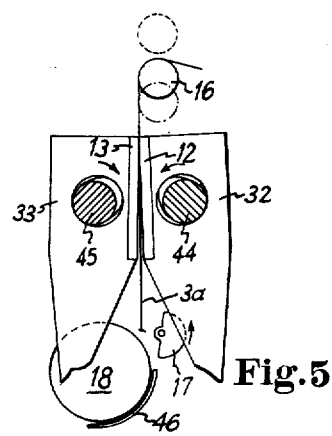
FIGURES 5 through 8 are schematic elevational views illustrating the rocking motion of the cutting and scoring dies.

The rocking movement of the dies is illustrated in FIGURES 5 through 8 in exaggerated form, the successive figures illustrating the operating cycle of the dies. Thus, as seen in FIGURE 5, the dies are moving toward each other and, by reason of their rocking action, the leading edges of the dies will contact the web first. It will be noted that at this juncture the oscillating wheel 16 is rising, its approximate position being illustrated in solid lines and its alternate uppermost and lowermost positions in dotted lines. It will also be noted that the leading edge 3a of the web projects downwardly from between the platen members, the projecting portion of the web constituting a yet unsevered blank cut and scored during the preceding operating cycle of the dies. At this juncture the rotary kicker 17 is in an inoperative position.

Figure 6:
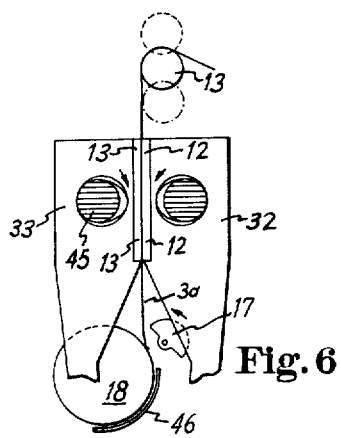
Figures 7, 8:
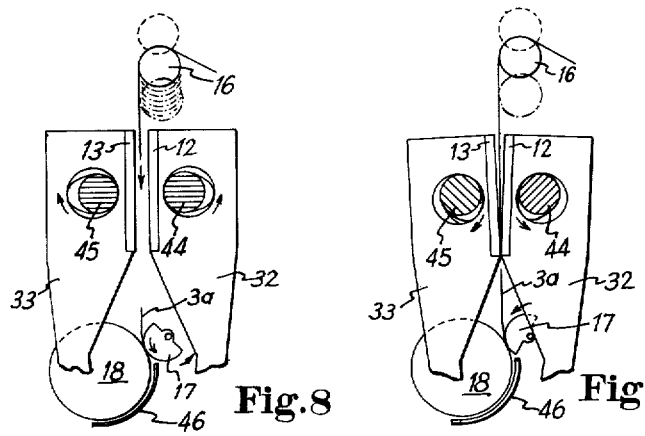

FIGURE 6 illustrates the relative positions of the parts when the dies are fully closed; and at this juncture it will be noted that the oscillating wheel 16 is at approximately the mid point of its rise and the kicker 17 is approaching the leading edge 3a of the web. The die housings and their legs 34, 35 are moving downwardly under the influence of the eccentric shafts 44, 45 and at the same time the legs are being drawn inwardly by the links 38, 39 as they pivot downwardly about pivot points 40, 41, respectively. The inward movement of the legs, 34, 35 acts to rock the platen members toward their trailing ends so that, as illustrated in FIGURE 7, the platen members will begin to open from top to bottom; and at this juncture the oscillating wheel 16 is moving toward its uppermost position and the rotary kicker 17 contacts the leading edge of the web and accelerates it so as to break the lowermost blank 3a therefrom. The dies are now moving upwardly and outwardly, and as they do the links 38, 39 will pivot outwardly and upwardly, thereby moving the platen members to the position illustrated in FIGURE 8, which is their fully opened position. During this portion of the cycle, the oscillating wheel 16 will move downwardly, thereby accelerating the feeding speed of the web; and at the same time the kicker 17 will be advancing the now severed blank defining portion 3a of the web between indexing roll 18 and guide 46 which coact to deliver the severed blank to the rotary strippers 19 and 20.

It will be evident that as the upward movement of the dies continues, the legs 34 and 35 will pivot outwardly so that, as the dies again begin to move inwardly, the platen members will be inclined with their leading edges innermost, thereby returning the parts to the position illustrated in FIGURE 5. At the same time the oscillating roll 16 will have begun its upward movement, but the combined feeding effect of the oscillating roll and the metering rolls 8 will have brought the next succeeding portion of the web and the printed indicia thereon into proper registry with the platen members for the next succeeding cutting and scoring operation.

The Indexing Rolls

Figure 2:
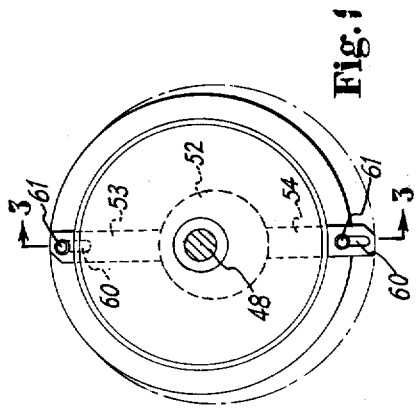
FIGURE 2 is a side elevational view of an indexing roll of the type utilized to bring the carrier blanks into proper time relation with respect to the operating components of the device.
Figure 3:
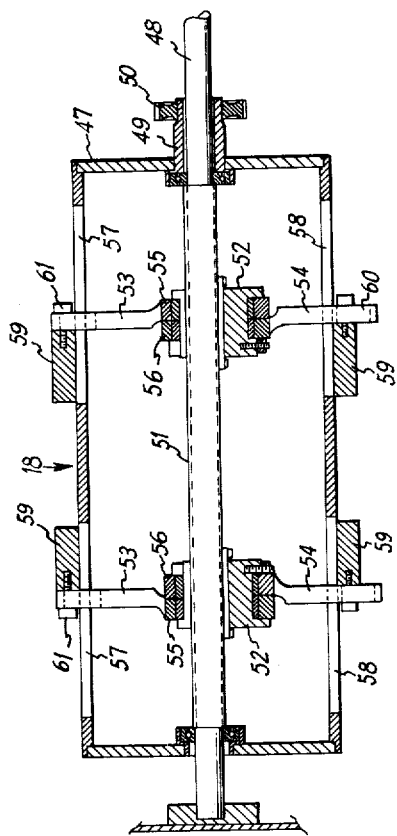
FIGURE 3 is a vertical sectional view taken along the lines 3—3 of FIGURE 2.
Figure 4:
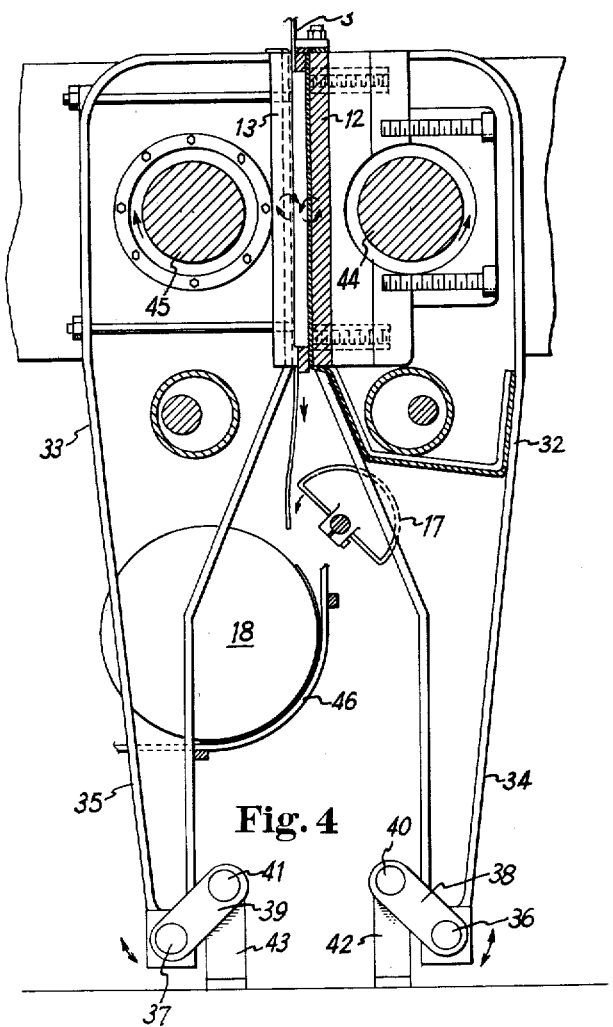
FIGURE 4 is a vertical sectional view of the cutting and scoring dies utilized to sever and score the paperboard web to define individual carrier blanks.

In order to assure proper registry of the blanks with the sets of rotary stripping rolls 19, 20, the indexing roll 18 is driven in timed relation to the stripping means and provided with retractable blank engaging lugs or pins which contact the trailing edges of the blanks after they have been released by the kicker 17. Referring now to FIGURES 2 and 3 of the drawings, the indexing roll 18 comprises a drum 47 rotatably journaled on a fixed shaft 48, the drum being rotated relative to the shaft by means of hub 49 and gear 50. A sleeve 51 is fixedly secured to the shaft 48 within the confines of the drum and mounts a set of spaced apart axially adjustable cams 52 displaced laterally from the axis of rotation of the drum. The cams mount outwardly projecting sets of oppositely directed lugs or pins 53, 54 terminating inwardly in annular collars 55, 56 which surround and are rotatable relative to the cams 52. At their outermost ends the sets of lugs 53, 54, project outwardly through elongated slots 57, 58 in the periphery of the drum where they lie in edge abutting sliding engagement with the steel rings 59 which surrounds and are secured to the drum 47. As seen in FIGURE 3, the sets of lugs 53, 54 have slots 60 therein through which guide bolts 61 are passed, the guide bolts being secured to the rings 59.

With this arrangement, the lugs 53, 54 rotate with the drum 47 and in so doing move relative to the cams 52 which, due to their eccentric relation to the axis of rotation of the drum, act to move the lugs from the retracted position illustrated by the lugs 53 to the extended or blank engaging position illustrated by the lugs 54.

In operation, the indexing roll will be so timed relative to the stripping rolls 14, 15 that the lugs will be fully extended and will contact the trailing edge of the carton blank after it has been released by the kicker 17, the lugs as they rotate with the indexing roll acting to advance the blank so that its leading edge will come under the influence of the stripping means at the proper moment. As the blank is advanced by the lugs, they will begin to retract and the trailing edge of the blank will be released by the lugs upon the engagement of its leading portion by the stripping means. The retracting lugs have been found to overcome difficulties heretofore encountered where rigidly mounted lugs have tended to cut into and mutilate the edges of the blanks being conveyed as the lugs disengage the blank.

The stripping means do not constitute a limitation upon the instant invention, but preferably will comprise pin stripping means of the type wherein the areas of the blank to be removed are punctured by pins mounted on the stripper 15, the removed portions of the blank then being removed from the pins by suitably positioned fingers, combs, or cams, the waste material removed from the pin being drawn into the vacuum tube 21 for disposal.

From the stripping means the blanks are advanced to the second indexing roll 22 which, for practical purposes, is of identical construction to the indexing roll 18 just described. In this instance, however, the indexing roll is driven in timed relation to the rotary folder 23, as by means of suitable gearing in meshing engagement with the drive gear 50 for the drum 47.

The Rotary Folder

Figure 13:
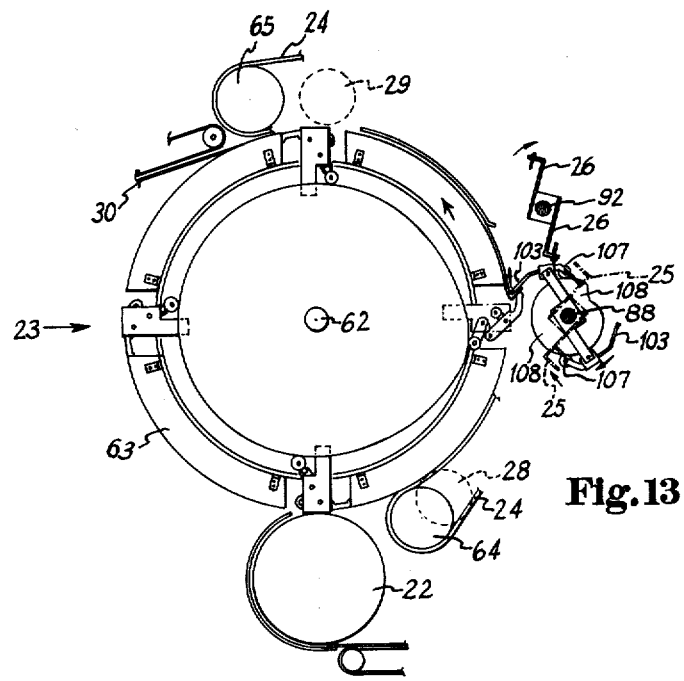
FIGURE 13 is a fragmentary side elevational view with parts broken away illustrating the rotary folding mechanism including the sets of folding fingers.
Figure 14:
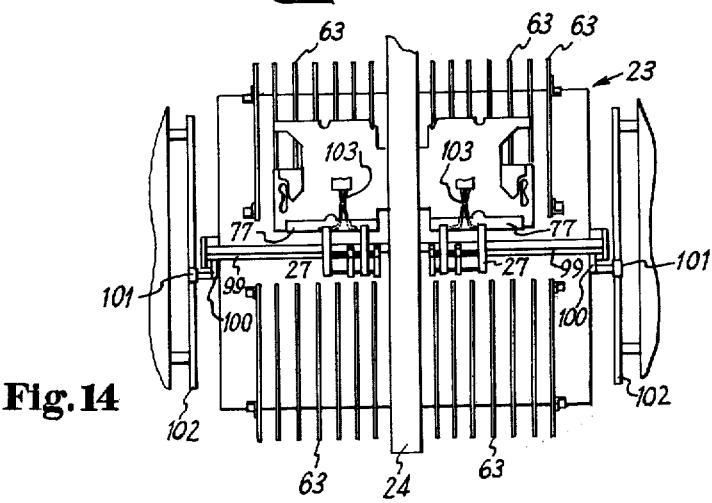
FIGURE 14 is a sectional view taken along the line 14—14 of FIGURE 13.

Referring now to FIGURES 13 and 14 of the drawings, the folder 23 comprises a cylindrical body mounted for rotation on a drive shaft 62 suitably journaled to the machine frame. Preferably, the periphery of the folder will be defined in part at least by spaced apart disclike segments 63 which support the blanks at spaced apart intervals and permit the engagement of the undersurfaces of the blanks by the sets of folding fingers 25 and 26. As the blanks are fed to the folder from the indexing roll 22 they are engaged and juxtaposed to the cylindrical surface of the folder by the hold-down belt 24 which passes around sheaves 64 and 65, whereupon areas of the blank are contacted by glue rolls indicated diagrammatically at 28 which apply adhesive to predetermined areas of the blank which are to be infolded and adhered by the sets of rotating fingers 25 and 26 and the retractable fingers 27.

Since the orientation and timing of the various sets of folding fingers is dependent upon the configuration of the blanks being acted upon, it is well at this juncture to refer to FIGURES 9 through 12 of the drawings which illustrate an exemplary carrier blank which may be folded and glued utilizing the rotary folder illustrated in FIGURES 13 and 14. The flat blank comprises a centrally disposed bottom panel 66 having a medial score line 67 therein, the opposite side edges of the bottom panel being articulated to side wall panels 68 and 69 which have partial end wall panels 70, 71, 72 and 73 at their opposite ends, the partial end wall panels terminating outwardly in attachment flaps 75, 76, 77, and 78. The structure illustrated is of the so-called high center cell variety in which handle forming parts 79 and 80 are connected to the side walls 68 and 69 by means of transverse partition members 81 and 82. Similarly, handle reinforcing parts 83 and 84 are hingedly articulated to the end edges of the handle parts 79 and 80 and connected to the side walls 68 and 69 by means of transverse partitions 85 and 86. In addition, the handle parts 79 is provided with an attachment flap 87.

Figure 9:
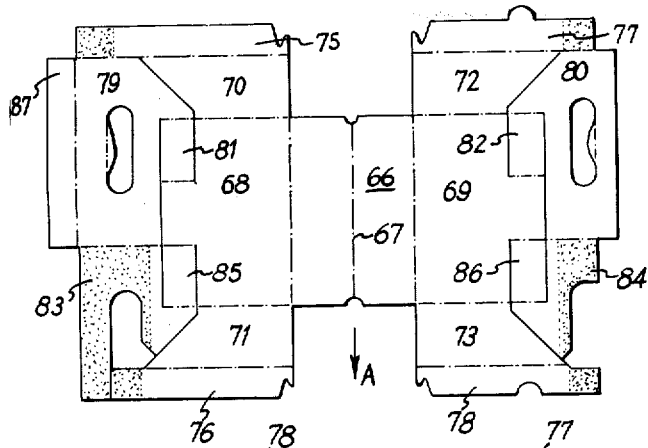
FIGURES 9 through 12 are plan views illustrating successive stages in the folding and gluing of a bottle carrier structure of the type capable of being fabricated by means of the machine.
Figure 10:
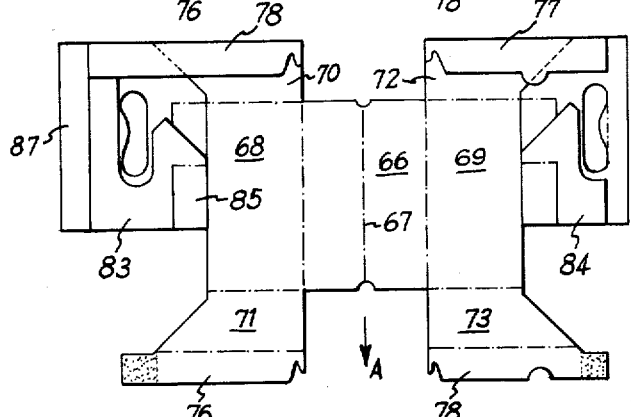

The carrier blank just described is fed to the rotary folder in the direction of the arrow A with its outer surface or printed side against the folder and, upon being secured to the folder by the hold-down belt 24, the adhesive applicators 28 will act to apply adhesive to the shaded areas of the attachment flaps 75 through 78 and the handle reinforcing parts 83 and 84, as illustrated by the shaded areas in FIGURE 9, whereupon the parts 83 and 84 are engaged and infolded by the rotating folding fingers 25.

The Folding Fingers

Referring now to FIGURES 13 and 15, the folding fingers 25 are preferably formed in oppositely directed pairs mounted on a shaft 88 rotatably journaled in the machine frame and driven in timed relation to the folder drive shaft 62 in the direction indicated by the arrows. It also will be understood that a second pair of folding fingers 25 will be spaced axially along the shaft 88, with the fingers in each pair contacting the handle reinforcing parts on the opposite halves of the blank. Thus, as the fingers rotate their angularly related tips 89 will pass between adjacent discs 63 of the folding cylinder ahead of the blank and the more rapidly moving cylinder will cause the tips to engage the undersurfaces of the handle reinforcing parts 83 and 84, the engagement of one such part being illustrated in FIGURE 15. This movement causes the parts to be folded outwardly and rearwardly and at the same time the supplementary fingers 90 which mount friction pads 91 have contacted the body of the blank in areas adjacent the fold lines of the parts 83 and 84 and hence supports the blank and assist in enforcing the folding of the parts 83 and 84 along their lines of articulation to the handle parts.

The infolding of the trailing attachment flaps 75 and 77 is next effected by means of the sets of retractable fingers 27, one of which is illustrated in FIGURE 16. These fingers are mounted on links 94 and 95 by means of pins 96 and 97, the links being connected in turn to rock shafts 98 and 99. The shafts 99 mount at one end actuating arms 100 having cam followers 101 at the free ends thereof which follow the irregular cams 102 fixedly mounted to the machine frame. As the cam follower passes over the eccentric portion of the cam, the retractable fingers 27 will be projected to infold the trailing attachment flaps.

In order to insure the positive infolding of the trailing flaps, it has been found desirable to provide folding bars or feet 103 which may be conveniently mounted on shaft 88 for rotation therewith, the folding bars being mounted adjacent the pairs of fingers 25. As seen in FIGURE 17, the folding bars or feet 103 are secured to blocks 104 pivotally connected to a mounting bracket 105 secured to the shaft 88, the entire assembly being rotatable therewith. The blocks 104 have rearwardly projecting legs 106 which mount cam followers 107 which engage irregular cams 108 which, while surrounding the shaft 88, are free from attachment to the shaft and are stationary relative to the parts which rotate with the shaft. Springs 109 act to bias the cam followers into contact with the periphery of the cam.

In operation, the folding bars or feet 103 rotate with the shaft 88 and are oriented to contact the blank immediately adjacent the trailing attachment flap 75 and 77 just as the retractable folding fingers 27 emerge to enforce the forward folding of these flaps. Since the folding bars are moving with the blank they will provide a support for the infolding of the trailing flaps. Upon forward folding of the flaps, the folding bars are withdrawn outwardly as the cam followers 101 fall from the rise 110 in stationary cams 108. The infolding of the handle reinforcing parts and the trailing attachment flaps brings the blank to the condition illustrated in FIGURE 10 of the drawings.

Following the infolding of the aforementioned parts, the sets of folding fingers 26, which are rotatably mounted on a shaft 92 also driven in timed relation to the rotary folder, contact and infold the partial end wall panels 71, 73 and the attachment flaps 76, 78 articulated thereto. This operation is also illustrated in FIGURE 15 wherein the tip of the finger 26 is shown engaged in back of the attachment flap 78. In this instance, pins 93 were found useful in assisting in the infolding of the parts. Of course, if it is necessary to enforce the folding of the parts, a secondary finger and friction pad may be employed.

Figure 11:
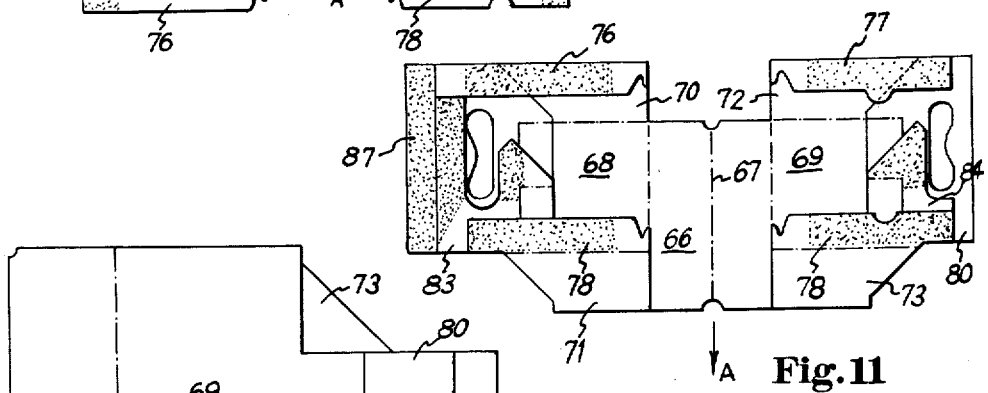
Figure 12:
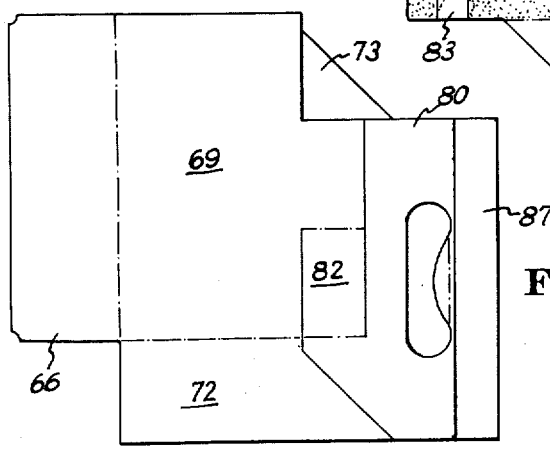

It will be understood that the folding operations just described occur in rapid sequence, the infolding of the partial end wall panels 71 and 73 at the leading end of the blank serving to bring the blank to the condition illustrated in FIGURE 11. When the blank is in the condition illustrated, it next passes beneath the adhesive applicators 29 for the application of adhesive to the areas indicated by shading in FIGURE 11. At this juncture the blank leaves the rotary folder and passes onto the straight line belt folder 30, illustrated in FIGURE 1, which acts to fold the blank medially along the score line 67 in the bottom panel 66, thereby juxtaposing the opposite halves of the blank and securing the attachment flaps 75, 77 and 76, 78 together in face-to-face engagement, along with the opposing portions of the handle structure. As a final operation, the attachment flap 87 at the outermost end of handle part 79 is infolded and adhesively secured to the handle part 80, thereby bringing the carrier structure to the condition illustrated in FIGURE 12, which is its knocked-down flat folded form. In order to assure the positive adhesive attachment of the various parts, the blank is next passed beneath a series of pressure rollers 31 which apply positive sealing pressure to the folded structure.

Having thus described the invention in an exemplary embodiment, it will be readily apparent that numerous modifications may be made in the invention without departing from its spirit and purpose. Needless to say, variations in the design of the carton structures being assembled will dictate obvious alterations in the positioning and timing of the various components of the machine. Essentially, however, the instant invention provides an integrated carton forming and assembling machine which is extremely compact and yet capable of high speed production. The orientation of the operating components of the machine is such that the carton forming material flows continuously and automatically from station to station in an endless procession. In particular, the rotary folding device contributes greatly to the compact character of the machine in that both forward and reverse folding of the blanks takes place in an extremely short span, the sets of folding fingers acting to infold both leading and trailing parts of a carton blank along lines of articulation extending generally transversely of the direction of movement of the blank. The leading parts of the blank are those which are folded rearwardly in opposition to the direction of motion of the advancing blank, whereas the trailing parts are those which are folded forwardly in the direction of travel of the blank.

In accordance with the foregoing disclosure, what I desire to secure and protect by Letters Patent is:

1. In combination in a machine for forming and assembling paperboard cartons, feeding means for advancing a web of paperboard to a blank forming station, die means at said blank forming station for cutting and scoring the web both longitudinally and transversely to define completely formed individual carton blanks, means for receiving the blanks as they are formed and advancing them seriatim to an assembly station, rotating means at said assembly station for receiving the blanks and advancing them in a circular path of travel, means for applying adhesive to predetermined areas of the blanks to be adhered together, folding means coacting with said rotating means to infold designated parts of the blanks along lines of fold extending transversely to the direction of travel of the blanks, means for receiving the folded and glued blanks from the rotating means and advancing them in a straight line path of travel, and means for effecting additional folding and gluing of the blank along lines of fold paralleling their straight line path of travel.

2. In combination in a machine for forming and assembling paperboard cartons, feeding means for advancing a web of paperboard to a blank forming station at which a coacting pair of reciprocating die means acts upon the web to define completely formed individual carton blanks which are cut and scored both longitudinally and transversely, said feeding means comprising a constant speed feeding roller arranged to withdraw the web from a supply roll at a uniform rate of speed, metering means for varying the speed of the web as it approaches the blank forming station, said metering means acting to time the movement of the web to the movement of the die means at the blank forming station, and a tension wheel riding on the web intermediate said feeding roller and said metering means, said tension wheel acting to provide a loop in the web effective to compensate for variations in the speed of travel of the web due to the action of said metering means, means for receiving the blanks as they are formed and advancing them seriatim to an assembly station, rotating means at said assembly station for receiving the blanks and advancing them in a circular path of travel, means for applying adhesive to predetermined areas of the blanks to be adhered together, folding means coacting with said rotating means to infold designated parts of the blanks along lines of fold extending transversely to the direction of travel of the blanks, means for receiving the folded and glued blanks from the rotating means and advancing them in a straight line path of travel, and means for effecting additional folding and gluing of the blanks along lines of fold paralleling their path of travel.

3. In combination in a machine for forming and assembling paperboard cartons, feeding means for advancing a web of paperboard to a blank forming station, die means at said blank forming station for cutting and scoring the web to define individual carton blanks, said die means comprising a pair of platen members each mounted on a body block having an elongated downwardly projecting leg pivoted at its lower end to one end of a link the opposite end of which is pivoted to a fixed support underlying said platen members, means for effecting movement of each of said body blocks in a generally circular path of travel in which said platen members move from an open to a closed position and then reopen during each cycle of operation, and an oscillating roll in engagement with said web in advance of said die means, actuating means for said oscillating roll acting to move said roll in timed relation to the movement of said platen members, said actuating means moving said oscillating roll away from said platen members as said platen members move to the closed position and toward said platen members as they separate, whereby to effectively arrest feeding movement of the web relative to said platen members when said web is engaged therebetween and to accelerate the feeding movement of the web relative to said platen members when they are opened, means for receiving the blanks as they are formed by the die means and advancing them seriatim to an assembly station, rotating means at said assembly station for receiving the blanks and advancing them in a circular path of travel, means for applying adhesive to predetermined areas of the blanks to be adhered together, folding means coacting with said rotating means to infold designated parts of the blanks along lines of fold extending transversely to the direction of travel of the blanks, means for receiving the folded and glued blanks from the rotating means and advancing them in a straight line path of travel, and means for effecting additional folding and gluing of the blanks along lines of fold paralleling their path of travel.

4. The combination claimed in claim 3 wherein the means for effecting a generally circular movement of said body blocks comprises a driven eccentric shaft rotatably journaled in each of said body blocks, and wherein, by reason of the pivotal linkage of the depending legs of said die means, said platen members close in a rocking motion in which their leading edges contact the web first, followed by their intermediate portions and ending with the trailing edges of the platen members in contact with the web as the leading edges begin to open.

5. In combination in a machine for forming and assembling paperboard cartons, feeding means for advancing a web of paperboard to a blank forming station, reciprocating die means at said blank forming station for cutting and scoring the web both longitudinally and transversely to define completely formed individual carton blanks, means for receiving the blanks as they are formed and advancing them seriatim to an assembly station, said last named means comprising an indexing roll and a coacting rotary kicker positioned to engage the leading edge of the web therebetween as the die means begin to open, said kicker being driven at a speed such that it will accelerate the leading edge of the web sufficiently to separate the leading blank defined therein from the remainder of the web, rotating means at said assembly station for receiving the blanks and advancing them in a circular path of travel, means for applying adhesive to predetermined areas of the blanks to be adhered together, folding means coacting with said rotating means to infold designated parts of the blanks along lines of fold extending transversely to the direction of travel of the blanks, means for receiving the folded and glued blanks from the rotating means and advancing them in a straight line path of travel, and means for effecting additional folding and gluing of the blanks along lines of fold paralleling their path of travel.

6. The combination claimed in claim 5 wherein said indexing roll includes retractable pins arranged to engage the trailing edges of the separated blanks and advance them in timed relation to a scrap stripping station lying beyond said indexing roll and in advance of said assembly station, and stripping means at said stripping station for removing scrap from said blanks.

7. In combination of a machine for forming and assembling paperboard cartons, feeding means for advancing a web of paperboard to a blank forming station, die means at said blank forming station for cutting and scoring the web both longitudinally and transversely to define completely formed individual carton blanks, means for receiving the blanks as they are formed and advancing them seriatim to an assembly station, rotating means at said assembly station for receiving the blanks and advancing them in a circular path of travel, said rotating means comprising a circular member and means for releasably securing the carton blanks to the periphery of said circular member for movement therewith, folding means coacting with said rotating means to infold designated parts of the blanks along lines of fold extending transversely to the direction of travel of the blanks, means in advance of said folding means for applying adhesive to the designated parts of the blank to be adhered together, means for receiving the folded and glued blanks from the circular member and advancing them in a straight line path of travel, and means for effecting additional folding and gluing of the blanks along lines of fold paralleling their path of travel.

8. The combination claimed in claim 7 wherein the folding means coacting with said rotating means includes a first set of rotating fingers mounted on a rotating shaft lying adjacent the path of travel of said rotating means, said fingers rotating in timed relation to the movement of the rotating means so as to be traveling in the direction as the direction of movement of the carton blanks but at a slower rate of speed so that said fingers will engage and fold rearwardly designated leading parts of the blanks.

9. The combination claimed in claim 8 including a second set of rotating fingers positioned to engage and fold rearwardly other designated areas of the blanks.

10. The combination claimed in claim 8 wherein the folding means coacting with said rotating means includes a set of retractable folding fingers pivotally mounted on said rotating means for rotation therewith, cam means for moving said last named fingers from a retracted position in which they lie beneath the circular surface of said rotating means to an extended position in which they are projected outwardly therefrom so as to engage and fold forwardly areas of the carton blank contacted thereby, and rotating folding bars moving in timed relation to said rotating means and coacting with said retractable fingers to enforce the folding of the parts contacted and folded forwardly by said retractable fingers, said folding bars including means operative to withdraw said bars upon movement of said retractable fingers to their extended positions.

11. In combination in a machine for forming and assembling paperboard cartons, feeding means for advancing a web of paperboard to a blank forming station, die means at said blank forming station for cutting and scoring the web to define individual carton blanks, said die means comprising a pair of platen members each mounted on a body block, means for effecting rotary movement of each of said body blocks in a generally circular path of travel in which said platen members move from an open to a closed position and then reopened during each cycle of operation, an oscillating roll in engagement with said web in advance of said die means, actuating means for moving said oscillating roll in timed relation to the movement of said platen members, said actuating means acting to move said oscillating roll away from said platen members as they move to the closed position and toward said platen members as they separate, whereby to effectively arrest feeding movement of the web relative to said platen members when said web is engaged therebetween and to accelerate feeding movement of the web relative to said platen members when they are opened, means for receiving the blanks as they are formed and advancing them seriatim to assembly station, rotating means at said assembly station for receiving the blanks and advancing them in a circular path of travel, said rotating means comprising a circular member and means for releasably securing the carton blanks to the periphery of said circular member for movement therewith, folding means coacting with said circular member to infold designated parts of the blanks along lines of fold extending transversely to the direction of travel of said blanks, said folding means including a set of rotating fingers mounted on a fixed support lying adjacent the path of travel of said circular member, said rotating fingers moving in timed relation to the movement of the circular member so as to be traveling in the same direction as the carton blanks but at a slower rate of speed so that said fingers will engage and fold rearwardly designated leading parts of the blanks, and a set of retractable folding fingers pivotally mounted on said circular member for rotation therewith, cam means for moving said last named fingers from a retracted position in which they lie beneath the periphery of said circular member to an extended position in which they are projected outwardly therefrom so as to engage and fold the parts of the carton blanks contacted thereby, means for applying adhesive to designated areas of the blanks to be adhered together prior to the folding thereof by said sets of fingers, means for receiving the folded and glued blanks from said rotating cylinder and advancing them in a straight line path of travel, and means for effecting additional folding and gluing of the blanks along lines of fold paralleling their path of travel.

12. The combination claimed in claim 11 wherein said body blocks each terminates downwardly in an elongated leg pivoted at its lower end to one end of a link the opposite end of which is pivoted to a fixed support underlying said platen members, whereby said platen members close in a rocking movement in which their leading edges contact the web first, followed by their intermediate portions and ending with the trailing edges of the platen members in contact with the web as the leading edges begin to open, and wherein an indexing roll and a coacting rotary kicker are positioned to engage the leading edge of the web therebetween just as the die means release the web, said kicker being driven at a speed such that it will accelerate the leading edge of the web sufficiently to separate the leading blank defined therein from the remainder of the web.

13. The combination claimed in claim 12 including a scrapping station lying beyond said indexing roll and in advance of said assembly station, rotary stripping means at said stripping station for removing scrap from said blanks, said indexing roll including retractable pins arranged to engage the trailing edges of the separated blanks and advance them in timed relation to the movement of said rotary stripping means.

14. The combination claimed in claim 13 including a second indexing roll for receiving the blanks from said stripping station, said second indexing roll including retractable pins arranged to engage the trailing edges of the scrapped blanks and advance them to said rotating cylinder in timed relation therewith.

15. In mechanism for forming paperboard cartons, die means for cutting and scoring a web of paperboard to define individual carton blanks therein, said die means comprising a pair of platen members each mounted on a body block, means for effecting complementary rotary movement of said body blocks in a generally circular path of travel during which said platen members move relative to each other from an open to a closed position and then reopen during each rotative cycle of operation, means mounting said body blocks to additionally rock the platen members in such fashion that their leading edges will contact the web first, followed by their intermediate portions and ending with the trailing edges of the platen members in contact with the web as the leading edges being to move away from each other.

16. The mechanism claimed in claim 15 wherein the means mounting said body blocks for rocking movement comprise elongated legs projecting downwardly from said body blocks and pivoted at their lower ends to links which are in turn pivoted to fixed supports.

17. The mechanism claimed in claim 16 wherein said platen members are moving downwardly during the time they are in contact with the web, wherein they are moving outwardly and upwardly when they are out of contact with the web, and wherein the means for effecting a rocking movement of said body block comprises eccentric cam shafts rotatably journaled in said body blocks.

18. The mechanism claimed in claim 17 including feeding means ahead of said die means for continuously advancing the web of paperboard toward said die means, and means intermediate said web feeding means and said die means for controlling feeding movement of the web relative to the platen members when said platen members are in the closed position.

19. The mechanism claimed in claim 18 wherein said last named means comprises an oscillating roll overlying said platen members, said web passing upwardly from said feeding means, around said oscillating roll and then downwardly between said platen members, means for moving said oscillating roll toward and away from said platen members in timed relation to the opening and closing movement thereof, said moving means being driven in timed relation to the movement of said body blocks and acting to move said oscillating roll away from said platen members as they move to the closed position and toward said platen members as they move to the opened position.

20. The mechanism claimed in claim 19 including means underlying said platen members for receiving the leading edge of the cut and scored web and separating it into individual blanks, said last named means comprising a rotary kicker positioned to engage the leading edge of the web therebetween as the platen members begin their opening movement and prior to the downward movement of said oscillating roll, said kicker being driven in timed relation to the movement of said platen members and at a speed such that it will accelerate the movement of the leading edge of the web sufficiently to separate the leading blank defined therein from the remainder of the web.

21. The mechanism claimed in claim 20 wherein an indexing roll is positioned to receive the separated blanks, said indexing roll including retractable pins arranged to engage the trailing edges of the separated blanks as they are advanced by said kicker, said indexing roll including cam means operative upon rotation thereof to project and retract said pins.

22. In mechanism for forming paperboard cartons, a rotary folding device for folding and adhesively securing together designated parts of paperboard cartons forming blanks, said device comprising a rotating cylinder, means for juxtaposing the carton blanks to the cylindrical surface of said cylinder with the lines of articulation of the parts to be folded extending generally parallel to the axis of rotation of said cylinder, means for releasably securing the carton blanks to said cylinder for movement therewith, a set of folding fingers positioned adjacent the path of travel of said cylinder, means mounting said folding fingers for rotary movement in timed relation to the rotation of said cylinder, said fingers traveling in the same direction as the direction of movement of the carton blanks but at a slower rate of speed and being positioned to engage and fold rearwardly designated leading parts of said blanks as the fingers rotate into contact therewith.

23. The mechanism claimed in claim 22 including a set of retractable folding fingers movably mounted on said cylinder for rotation therewith, means for moving said last named folding fingers from a retracted position in which they lie beneath the cylindrical surface of said cylinder to an extended position in which they are projected outwardly so as to engage and fold forwardly parts of the carton blanks contacted thereby, and rotating folding bars moving in timed relation to said rotating cylinder and coacting with said retractable fingers to enforce the folding of the parts contacted and folded forwardly by said retractable fingers, said folding bars including means operative to withdraw said bars upon movement of said retractable fingers to their extended position.

24. The mechanism claimed in claim 23 wherein said cylinder is formed in part at least of disc-like elements lying in spaced apart relation, said disc-like elements being positioned so that said sets of fingers may move therebetween to engage the undersurfaces of the carton blanks.

25. The mechanism claimed in claim 24 wherein said folding bars are mounted for rotary movement on a common shaft with said first named set of folding fingers, wherein said folding bars are also mounted for pivot movement relative to said shaft, and wherein the means acting to withdraw the folding bars acts to pivot said folding bars relative to said shaft so as to cause them to be withdrawn from the path of travel of the advancing blanks.

26. In mechanism for forming paperboard cartons, a rotary folding device for folding and adhesively securing together designated parts of paperboard cartons, said device comprising a rotating cylinder, means for juxtaposing paperboard carton blanks to the cylindrical surface of said cylinder with the lines of articulation of the parts to be folded extending generally parallel to the axis of rotation of said cylinder, means for releasably securing the carton blanks to the surface of the cylinder for movement therewith, a first set of folding fingers mounted on a rotating shaft positioned adjacent the path of travel of said cylinder, said shaft being rotated in the same direction to the direction of rotation as said cylinder but at a slower rate of speed, said folding fingers each having an angularly related tip acting upon rotation thereof into the path of travel of the advancing blank, to engage beneath a leading edge of the blank and fold the engaged part outwardly and rearwardly.

27. The mechanism claimed in claim 26 wherein said fingers mount supplementary fingers projecting in generally parallel relation to said angularly related tips, said supplementary fingers mounting friction pads for engaging portions of blanks adjacent the parts being folded.

References Cited in the file of this patent

UNITED STATES PATENTS

| | | |
|---|---|---|
| 1,772,785 | Smith | Aug. 12, 1930 |
| 2,655,842 | Baumearther | Oct. 20, 1953 |
| 2,733,643 | Fergnani | Feb. 7, 1956 |
| 2,830,506 | Burroughs | Apr. 15, 1958 |
| 2,843,027 | Sevison | July 15, 1958 |
| 2,888,860 | Baumgartner | June 2, 1959 |
| 2,899,872 | Labombarde | Aug. 18, 1959 |
| 3,014,415 | Pierce | Dec. 26, 1961 |

FOREIGN PATENTS

| | | |
|---|---|---|
| 458,678 | Germany | Apr. 17, 1928 |

Dedication 3,111,064.—*Kenneth W. Jones*, Franklin, Ohio. MACHINE FOR FORMING AND ASSEMBLING PAPERBOARD CARRIERS. Patent dated Nov. 19, 1963. Dedication field Sept. 26, 1973, by the assignee, *International Paper Company*.

Hereby dedicates to the Public the entire remaining term of said patent.

[*Official Gazette February 19, 1974.*]